(12) United States Patent
Tariki

(10) Patent No.: US 6,982,757 B2
(45) Date of Patent: Jan. 3, 2006

(54) IMAGE SENSING APPARATUS

(75) Inventor: Motoi Tariki, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 417 days.

(21) Appl. No.: 09/903,174

(22) Filed: Jul. 11, 2001

(65) Prior Publication Data

US 2002/0008766 A1    Jan. 24, 2002

(30) Foreign Application Priority Data

Jul. 11, 2000    (JP)    ............................. 2000-210069

(51) Int. Cl.
*H04N 9/64* (2006.01)
*H04N 5/76* (2006.01)
*H04N 5/228* (2006.01)
*H04N 1/38* (2006.01)
*H04N 1/40* (2006.01)

(52) U.S. Cl. .................. 348/243; 348/251; 348/231.6; 348/222.1; 358/461; 358/463

(58) Field of Classification Search ................ 348/241, 348/243, 231.3, 231.6, 231.9, 222.1, 362, 348/367, 231, 251; 382/274; 358/448, 461, 358/463

See application file for complete search history.

(56) References Cited

U.S. PATENT DOCUMENTS

| | | | | |
|---|---|---|---|---|
| 5,398,119 A | * | 3/1995 | Suzuki et al. | 358/461 |
| 5,606,707 A | * | 2/1997 | Tomassi et al. | 358/448 |
| 5,926,214 A | * | 7/1999 | Denyer et al. | 348/243 |
| 5,943,094 A | * | 8/1999 | Sakai et al. | 348/243 |
| 6,046,771 A | * | 4/2000 | Horii | 348/241 |
| 6,072,912 A | * | 6/2000 | Orito | 382/274 |
| 6,144,408 A | * | 11/2000 | MacLean | 348/241 |
| 6,710,807 B1 | * | 3/2004 | Yamagishi | 348/221.1 |

FOREIGN PATENT DOCUMENTS

| | | |
|---|---|---|
| JP | A 06-054262 | 2/1994 |
| JP | A 08-037627 | 2/1996 |
| JP | A 10-170338 | 6/1998 |

* cited by examiner

*Primary Examiner*—David L. Ometz
*Assistant Examiner*—Nhan Tran
(74) *Attorney, Agent, or Firm*—Morgan & Finnegan, LLP (57) ABSTRACT

Disclosed is an image sensing apparatus having a function of removing a dark current noise component of an image sensor. This image sensing apparatus includes an image sensor such as a CCD, at least two noise component storage areas, a CPU for controlling an operation of writing a noise component of one frame generated by the image sensor into a noise component storage area selected from the at least two noise component storage areas, and a subtracter for correcting an object image photographed by the image sensor, on the basis of the noise component stored in one of the at least two noise component storage areas.

11 Claims, 9 Drawing Sheets

PRIOR ART

IMAGE SENSING APPARATUS

FIELD OF THE INVENTION

The present invention relates to an image sensing apparatus and, more particularly, to an image sensing apparatus having a function of removing noise such as dark current noise of an image sensor.

BACKGROUND OF THE INVENTION

With the recent spread of personal computers, digital still cameras and digital video cameras are spreading remarkably. Images sensed by an image sensor have a noise pattern produced by the influence of a dark current flowing through the sensor. This noise is called dark current noise. The darker the screen, the more conspicuous the dark current noise. Generally, the influence of this dark current noise is said to be larger in MOS image sensors than in CCD image sensors presently widely used. A conventional image sensing apparatus for removing the dark current noise will be described below with reference to FIG. 8.

Figure 8:
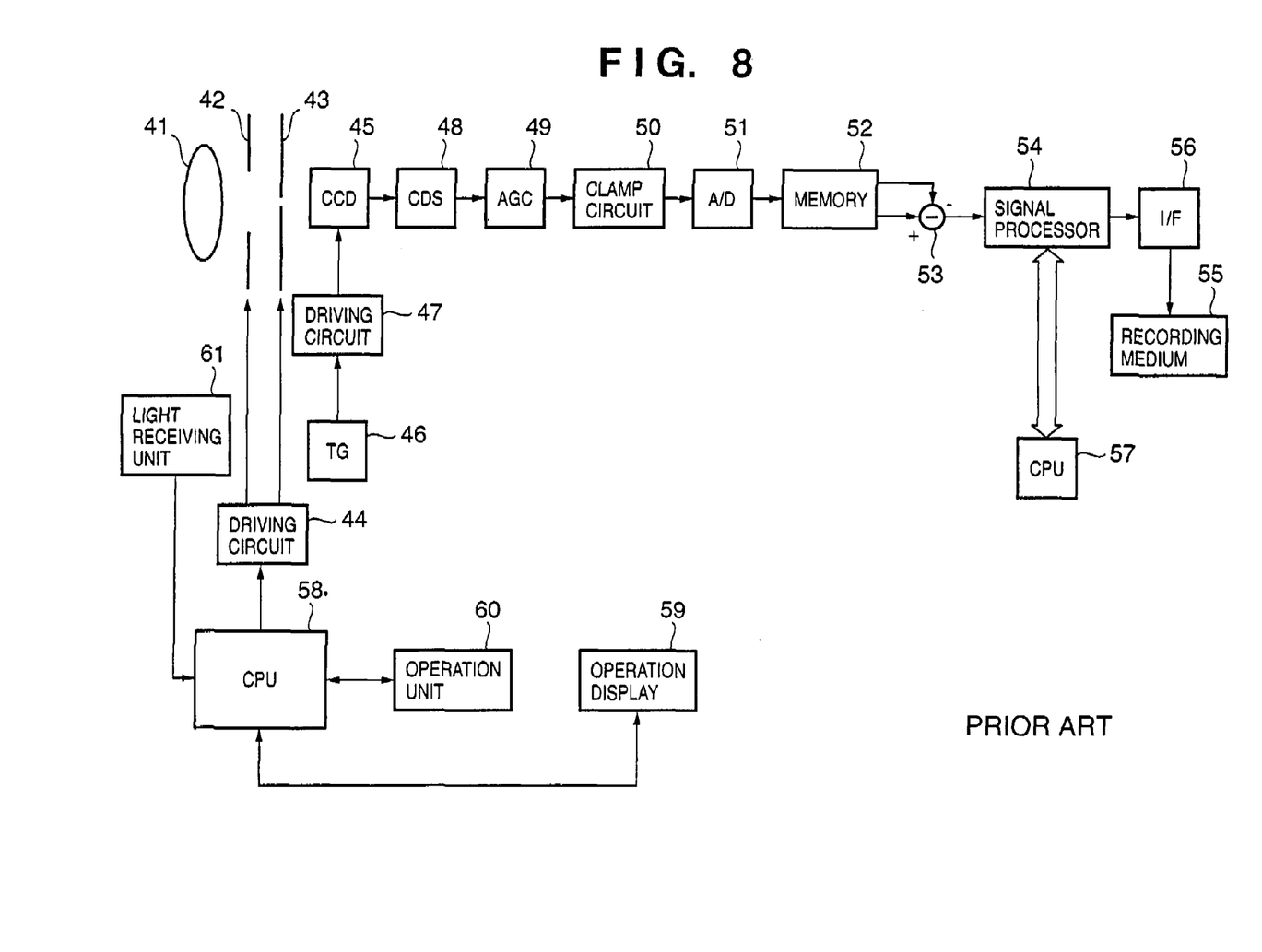
FIG. 8 is a schematic view showing the arrangement of a conventional digital electronic still camera.
Figure 9:
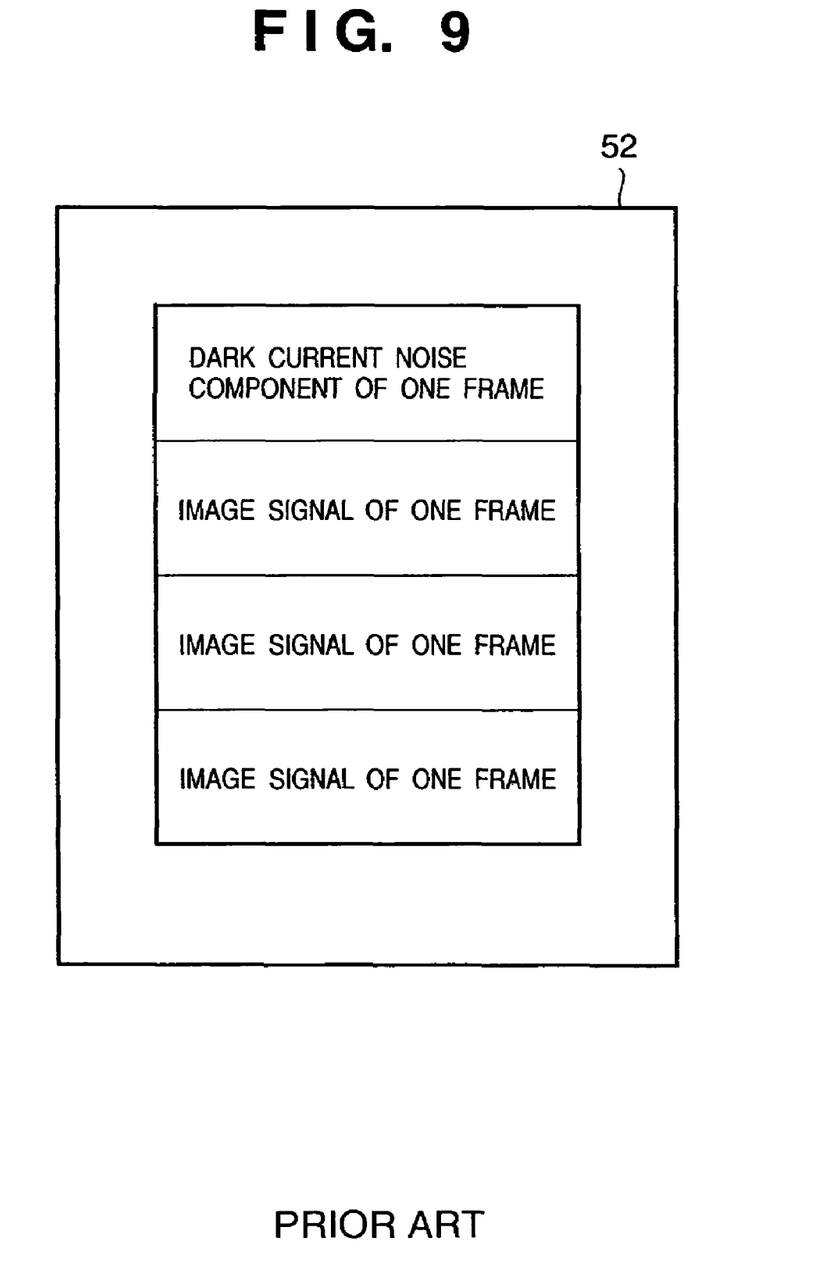
FIG. 9 is a schematic view showing the configuration of a memory 52 shown in FIG. 8.

FIG. 8 is a schematic view showing the arrangement of a conventional digital still camera. FIG. 9 is a schematic view showing the configuration of a memory 52 of the camera. Reference numeral 41 denotes an optical lens for forming an optical image of an object; 42, a stop; 43, a shutter; 44, a driving circuit for individual mechanical parts; 45, a CCD as an image sensor for converting an optical image of an object into an electrical signal; 46, a timing signal generator (to be referred to as a TG hereinafter) for generating a timing signal required to drive the CCD 45; 47, an image sensor driver for amplifying the signal from the TG 46 to a level necessary to drive the CCD 45; 48, a CDS (Correlation Double Sampling) circuit for removing the output noise from the CCD 45; 49, an AGC (Auto Gain Control) circuit for amplifying the output signal from the CDS circuit 48; and 50, a clamp circuit for clamping the zero level of the amplified signal. Reference numeral 51 denotes an A/D converter for converting an analog signal into a digital signal; 52, a memory for storing an image sensing signal; 53, a subtracter for subtracting dark current noise from the readout image signal from the memory 52; 54, a signal processor for processing the image signal from which the dark current is removed, thereby converting the signal into a signal suited to storage in a recording medium; and 55, a recording medium such as a memory card or hard disk. Reference numeral 56 denotes an interface circuit for recording a signal on the recording medium 55; 57, a signal processing control CPU for controlling the signal processor 54; 58, a CPU for controlling the mechanism and an operation unit; 59, an operation display for displaying information for assisting operations and displaying the camera status; 60, an operation unit for externally controlling the camera; and 61, an AE light receiving unit for measuring the luminance of an object to calculate an F-number and a shutter speed for correct exposure.

The operation of this conventional digital camera shown in FIG. 8 will be described below. When a user instructs the camera to start photographing by the operation unit 60, the camera starts photographing. First, the AE light receiving unit 61 measures the luminance of an object. On the basis of the measurement value, the CPU 58 for controlling the mechanism and the operation unit calculates an appropriate F-number and shutter speed. Next, an image signal is read by driving the CCD 45 with the shutter 43 being closed. The CDS circuit 48 removes noise from the read image signal, and the AGC 49 amplifies the signal as needed. The clamp circuit 50 clamps the zero level of the signal, and the A/D converter 51 converts the signal into a digital signal. This digital signal is stored in the memory 52. Since the shutter 43 is kept closed, the CCD 45 presumably senses no image. The image signal thus stored in the memory 52 is a noise pattern produced by the influence of a dark current, i.e., a dark current noise component.

Subsequently, the CPU 58 for controlling the mechanism and the operation unit controls the mechanism driving circuit 44 on the basis of the calculated control value, thereby controlling the amount of light passing through the stop 42 and the opening time of the shutter 43. That is, an optical image of the object is formed on the image area of the CCD 45 with an appropriate light amount corresponding to the opening time of the shutter. The CCD 45 is driven by a driving signal which the image sensor driver 47 forms by amplifying the output from the TG 46. The CDS circuit 48 removes noise from the read image signal, the AGC 49 amplifies the signal as needed, and the clamp circuit 50 clamps the zero level of the signal. The A/D converter 51 then converts the signal into a digital signal, and this digital signal is stored in the memory 52.

After that, the image signal and the dark current noise component stored in the memory 52 are read out. The subtracter 53 subtracts the dark current noise component from the image signal. The signal processor 54 processes this image signal from which the dark current noise component is canceled. The processed signal is recorded on the recording medium 55 via the interface circuit 56.

Generally, the dark current noise component of an image sensor such as a CCD or MOS depends upon the temperature, i.e., it is strongly influenced by the temperature of the sensor and its ambient temperature. Hence, this dark current noise component varies with time after the power supply of the camera is turned on. Accordingly, the dark current noise component read by driving the CCD 45 with the shutter 45 being closed and the image signal exposed and read by opening/closing the shutter 43 are desirably obtained with a short interval between them. In the above conventional image sensing apparatus, therefore, a dark current noise component is read from the CCD 45 and stored in the memory 52 immediately before photographing, and a photographed image is corrected by using this stored dark current noise component. Another image sensing apparatus reads a dark current noise component from the CCD 45 on a predetermined cycle and updates a dark current noise component stored in the memory 52.

In the method in which a user operates the operation unit 60 to instruct the camera to start photographing and a dark current noise component is read out from the CCD 45 in response to this instruction, a considerable time elapses from the time the photographing start instruction is entered to the time the photographing is actually started. Also, in the method in which a dark current noise component is read out from the CCD 45 and stored in the memory 52 on a predetermined cycle, if read and storage of a dark current noise component are being executed when the camera is instructed to start photographing, a considerable time elapses before the photographing is actually started. As described above, a user may lose a shutter chance when using the conventional image sensing apparatus.

SUMMARY OF THE INVENTION

It is an object of the present invention to provide an image sensing apparatus having a function of avoiding missing a photographing timing owing to processing for removing noise from an image sensor.

According to the first aspect of the present invention, there is provided an image sensing apparatus comprising an image sensor, a storage area adapted to store a signal contained in at least two frames, a controller adapted to control an operation of writing a signal contained in at least two frames, which is generated by the image sensor, into the storage area, and a correction unit adapted to correct a signal of an object image photographed by the image sensor, on the basis of the signal stored in the storage area.

In the image sensing apparatus of the first aspect of the present invention, it is preferable that if an operation of writing a signal generated by the image sensor into the storage area is being executed when photographing of an object image is designated, the controller makes photographing of the object image possible against the writing operation.

In the image sensing apparatus of the first aspect of the present invention, it is preferable that whenever writing a signal of one frame generated by the image sensor into the storage area, the controller switches storage areas into which the signal is to be written.

In the image sensing apparatus of the first aspect of the present invention, it is preferable that the image sensor comprises a shutter on an optical path for guiding light to the image sensor, a signal to be stored in the storage area is generated by the image sensor when the shutter is kept closed, and the object image is photographed when the shutter is opened.

In the image sensing apparatus of the first aspect of the present invention, it is preferable that the controller writes signals generated by the image sensor into the storage area in turn at a predetermined time interval in a photographing preparation state.

In the image sensing apparatus of the first aspect of the present invention, it is preferable that the controller writes signals generated by the image sensor into the storage area in turn at a predetermined time interval.

In the image sensing apparatus of the first aspect of the present invention, it is preferable that the correction unit subtracts a signal stored in the storage area from a signal of an object image photographed by the image sensor.

In the image sensing apparatus of the first aspect of the present invention, it is preferable that the controller allows storage of a signal of an object image photographed by the image sensor into the storage area in continuous photographing.

In the image sensing apparatus of the first aspect of the present invention, it is preferable that the controller allows storage of a signal of an object image photographed by the image sensor into the storage area.

In the image sensing apparatus of the first aspect of the present invention, it is preferable that a signal generated by the image sensor contains a dark current noise component.

In the image sensing apparatus of the first aspect of the present invention, it is preferable that the controller has a function of controlling the time of storage of electric charge to the image sensor during which a dark current noise component is acquired.

In the image sensing apparatus of the first aspect of the present invention, it is preferable that the correction unit corrects a signal of an object image photographed by the image sensor, on the basis of a noise component stored in the storage area and the time of storage of electric charge to the image sensor during which the noise component is acquired.

According to the second aspect of the present invention, there is provided an information processing apparatus which processes information provided by an image sensing apparatus, the apparatus comprising a storage unit adapted to store a first signal generated by an image sensor, wherein the first signal is a signal for correcting a second signal generated when the image sensor photographs an object, and a control unit adapted to give priority to designation of photographing of an object image over an operation of writing the first signal generated by the image sensor into the storage unit.

In the image sensing apparatus of the second aspect of the present invention, it is preferable that the storage unit stores a signal contained in at least two frames, which is generated by the image sensor.

In the image sensing apparatus of the second aspect of the present invention, it is preferable that the image sensing apparatus comprises a shutter on an optical path for guiding light to the image sensor, the first signal is generated by the image sensor when the shutter is kept closed, and the second signal is generated by the image sensor when the shutter is opened.

In the image sensing apparatus of the second aspect of the present invention, it is preferable that the control unit controls an operation of storing the first signal into the storage unit at a predetermined time interval in a photographing preparation state.

In the image sensing apparatus of the second aspect of the present invention, it is preferable that the control unit controls an operation of storing the first signal into the storage unit at a predetermined time interval.

In the image sensing apparatus of the second aspect of the present invention, it is preferable that the apparatus further comprising a correction unit adapted to correct the second signal, generated when the image sensor photographs an object, by using the first signal.

In the image sensing apparatus of the second aspect of the present invention, it is preferable that the control unit stores the second signal photographed by the image sensor into the storage area in continuous photographing.

In the image sensing apparatus of the second aspect of the present invention, it is preferable that the control unit stores the second signal photographed by the image sensor into the storage area.

In the image sensing apparatus of the second aspect of the present invention, it is preferable that the first signal generated by the image sensor contains a dark current noise component.

In the image sensing apparatus of the second aspect of the present invention, it is preferable that the control unit has a function of controlling the time of storage of electric charge to the image sensor during which a dark current noise component is acquired.

In the image sensing apparatus of the second aspect of the present invention, it is preferable that the control unit corrects the second signal in connection with the time of storage of electric charge to the image sensor during which a dark current noise component is acquired.

According to the third aspect of the present invention, there is provided an information processing apparatus which processes information provided by an image sensing apparatus, the apparatus comprising an acquisition unit adapted to acquire a signal generated by an image sensor, a storage unit adapted to store a first signal generated by the image sensor, wherein the first signal is a signal for correcting a second signal generated when the image sensor photographs an object, and a control unit adapted to give priority to designation of photographing of an object image over an operation of acquiring the first signal generated by the image sensor.

In the image sensing apparatus of the third aspect of the present invention, it is preferable that the storage unit stores a signal contained in at least two frames, which is generated by the image sensor.

In the image sensing apparatus of the third aspect of the present invention, it is preferable that the image sensing apparatus comprises a shutter on an optical path for guiding light to the image sensor, the first signal is generated by the image sensor when the shutter is kept closed, and the second signal is generated by the image sensor when the shutter is opened.

In the image sensing apparatus of the third aspect of the present invention, it is preferable that the control unit controls an operation of storing the first signal into the storage unit at a predetermined time interval in a photographing preparation state.

In the image sensing apparatus of the third aspect of the present invention, it is preferable that the control unit controls an operation of storing the first signal into the storage unit at a predetermined time interval.

In the image sensing apparatus of the third aspect of the present invention, it is preferable that the apparatus further comprising a correction unit adapted to correct the second signal, generated when the image sensor photographs an object, by using the first signal.

In the image sensing apparatus of the third aspect of the present invention, it is preferable that the control unit stores the second signal photographed by the image sensor into the storage area in continuous photographing.

In the image sensing apparatus of the third aspect of the present invention, it is preferable that the control unit stores the second signal photographed by the image sensor into the storage area.

In the image sensing apparatus of the third aspect of the present invention, it is preferable that the first signal generated by the image sensor contains a dark current noise component.

In the image sensing apparatus of the third aspect of the present invention, it is preferable that the control unit has a function of controlling the time of storage of electric charge to the image sensor during which a dark current noise component is acquired.

In the image sensing apparatus of the third aspect of the present invention, it is preferable that the control unit corrects the second signal in connection with the time of storage of electric charge to the image sensor during which a dark current noise component is acquired.

According to the fourth aspect of the present invention, there is provided a method of controlling an image sensing apparatus having an image sensor, the method comprising securing a storage area for storing a signal contained in at least two frames, and controlling an operation of writing a signal contained in at least two frames, which is generated by the image sensor, into the storage area, and correcting a signal of an object image photographed by the image sensor, on the basis of the signal stored in the storage area.

According to the fifth aspect of the present invention, there is provided a method of controlling an image sensing apparatus having an image sensor, the method comprising storing a first signal generated by the image sensor, wherein the first signal is a signal for correcting a second signal generated when the image sensor photographs an object, and giving priority to designation of photographing of an object image over an operation of writing the first signal generated by the image sensor into the storage area.

According to the sixth aspect of the present invention, there is provided a method of controlling an image sensing apparatus having an image sensor, the method comprising acquiring a signal generated by the image sensor, storing a first signal generated by the image sensor, wherein the first signal is a signal for correcting a second signal generated when the image sensor photographs an object, and giving priority to designation of photographing of an object image over an operation of acquiring the first signal generated by the image sensor.

According to the seventh aspect of the present invention, there is provided a memory medium storing a control program of an image sensing apparatus having an image sensor, the control program comprising securing a storage area for storing a signal contained in at least two frames, and controlling an operation of writing a signal contained in at least two frames, which is generated by the image sensor, into the storage area, and correcting a signal of an object image photographed by the image sensor, on the basis of the signal stored in the storage area.

According to the eighth aspect of the present invention, there is provided a memory medium storing a control program of an image sensing apparatus having an image sensor, the control program comprising storing a first signal generated by the image sensor, wherein the first signal is a signal for correcting a second signal generated when the image sensor photographs an object, and giving priority to designation of photographing of an object image over an operation of writing the first signal generated by the image sensor into the storage area.

According to the ninth aspect of the present invention, there is provided a memory medium storing a control program of an image sensing apparatus having an image sensor, the control program comprising acquiring a signal generated by the image sensor, storing a first signal generated by the image sensor, wherein the first signal is a signal for correcting a second signal generated when the image sensor photographs an object, and giving priority to designation of photographing of an object image over an operation of acquiring the first signal generated by the image sensor.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
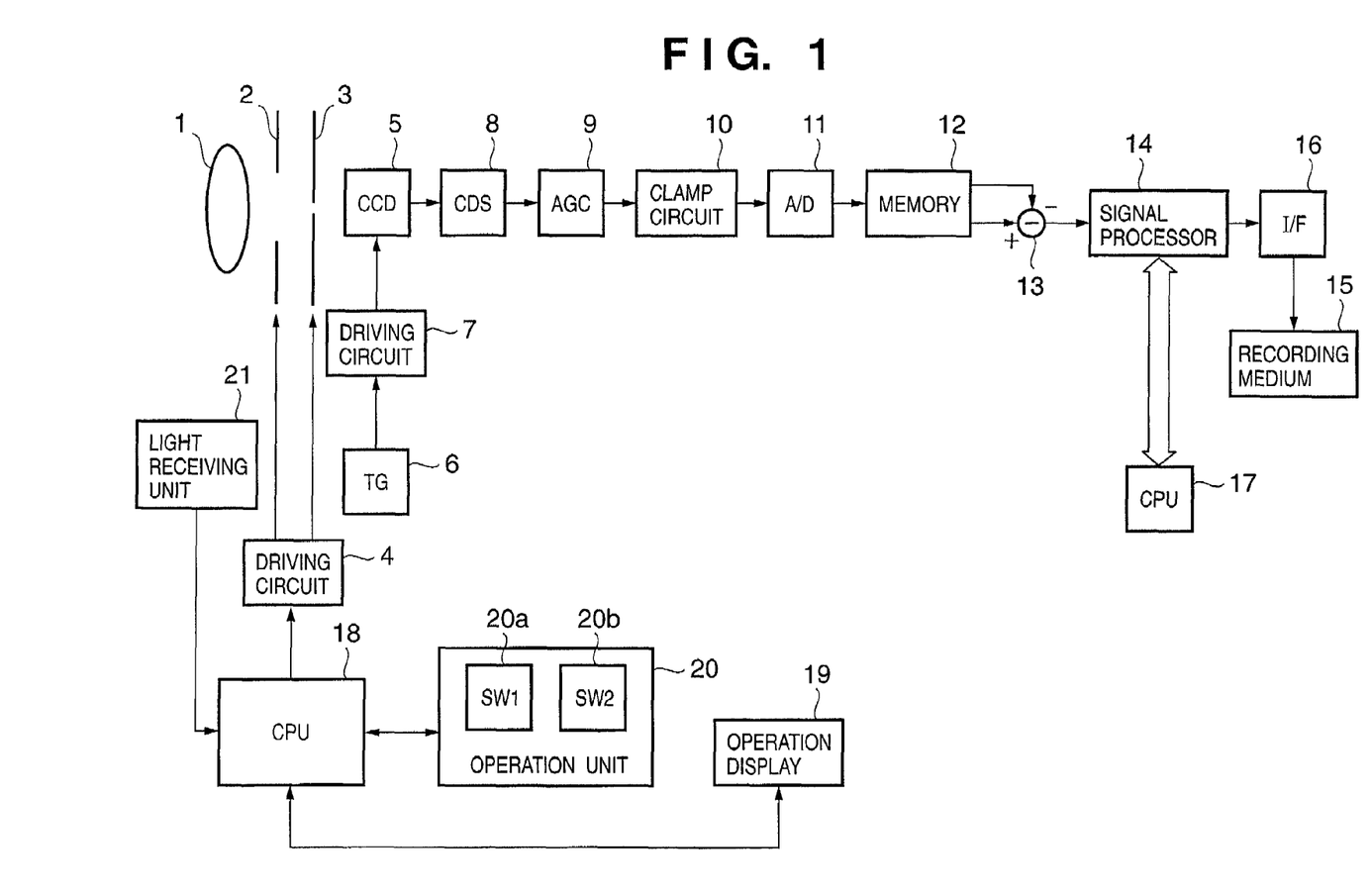
FIG. 1 is a schematic view showing the arrangement of an image sensing apparatus according to the first embodiment of the present invention.

FIG. 1 is a schematic view showing an image sensing apparatus according to the first preferred embodiment of the present invention. Reference numeral 1 denotes an optical lens for forming an optical image of an object; 2, a stop; 3, a shutter; 4, a driving circuit for individual mechanical parts; and 5, a CCD as an image sensor for converting an optical image of an object into an electrical signal. Reference numeral 6 denotes a timing signal generator (to be referred to as a TG hereinafter) for generating a timing signal required to drive the CCD 5; 7, an image sensor driver for amplifying the signal from the TG 6 to a level necessary to drive the CCD 5; 8, a CDS circuit for removing the output noise from the CCD 5; 9, an AGC circuit for amplifying the output signal from the CDS circuit 8; 10, a clamp circuit for clamping the zero level of the amplified signal; 11, an A/D converter for converting an analog signal into a digital signal; and 12, a memory.

Figure 2:
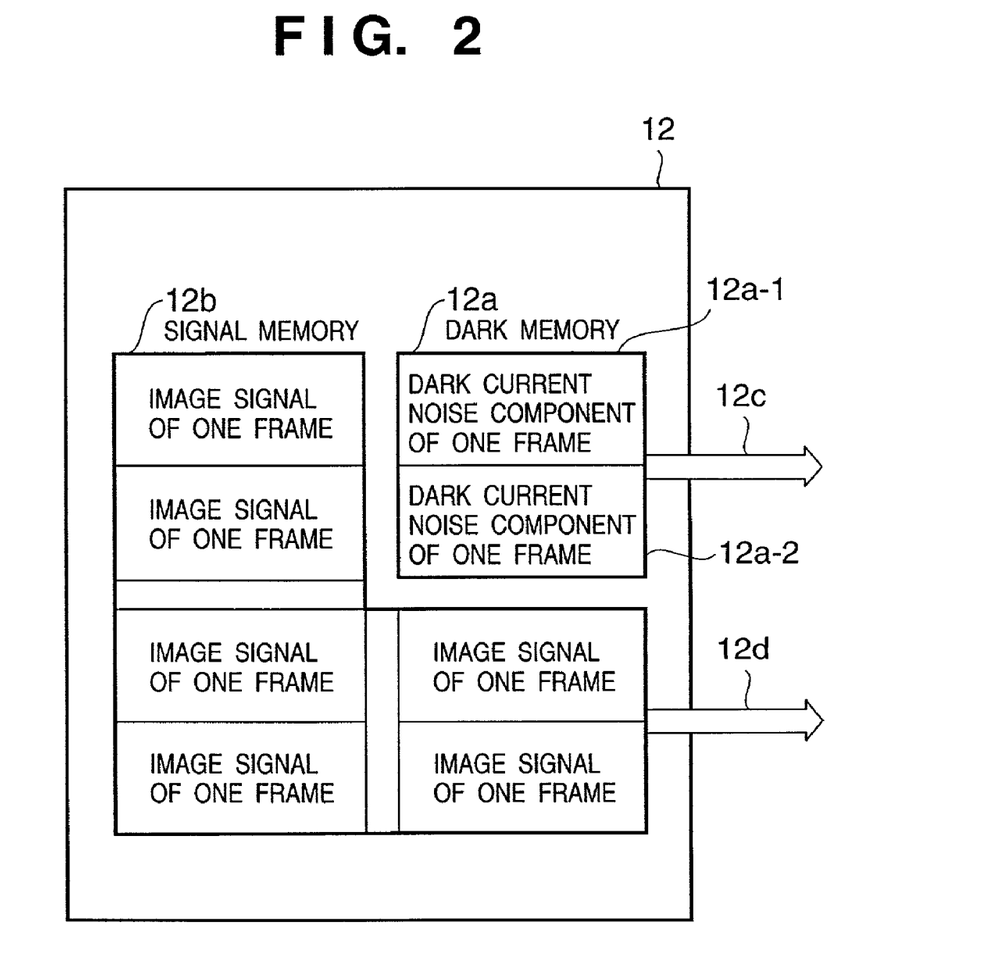
FIG. 2 is a schematic view showing the configuration of a memory 12 used in the present invention.

FIG. 2 is a schematic view showing the configuration of the memory 12. A dark memory 12a is a first memory area for storing dark current noise components. A signal memory 12b is a second memory area for storing image sensing signals. Each of the dark memory 12a and the signal memory 12b has independent signal lines (data lines, address lines, and command control lines) 12c and 12d. Note that the dark memory 12a and the signal memory 12b can be a physically single device or separate devices. The dark memory 12a has a capacity capable of storing dark current noise components of at least two frames.

Referring back to FIG. 1, reference numeral 13 denotes a subtracter for subtracting dark current noise from an image signal read out from the dark memory 12a and the signal memory 12b; 14, a signal processor for processing the image signal from which the dark current is removed, thereby converting the image signal into a signal suited to be stored in a recording medium; and 15, a recording medium such as a memory card or hard disk. Reference numeral 16 denotes an interface circuit for recording a signal on the recording medium 15; 17, a signal processing control CPU for controlling the signal processor 14; 18, a CPU for controlling the overall apparatus; 19, an operation display for displaying information for assisting operations and displaying the camera status; and 20, an operation unit for externally controlling the camera. This operation unit 20 includes a switch SW1 (20a) and a switch SW2 (20b).

Typically, these switches SW1 and SW2 are interlocked by a release button. Assume that the switch SW1 is turned on when the release button is pressed halfway, and the switch SW2 is turned on when the release button is pressed deep. Reference numeral 21 denotes an AE light receiving unit for measuring the luminance of an object to calculate an F-number and a shutter speed for correct exposure.

The first operation example of the above image sensing apparatus explained with reference to FIGS. 1 and 2 will be described below.

When a user turns on the switch SW1 of the operation unit 20 (presses the release button halfway) to instruct the camera to prepare for photographing, the camera starts photographing preparations.

First, the AE light receiving unit 21 measures the luminance of an object. On the basis of the measurement value, the CPU 18 calculates an appropriate F-number and shutter speed.

Next, an image signal is read by driving the CCD 5 with the shutter 3 being closed. The CDS circuit 8 removes noise from the read image signal, and the AGC 9 amplifies the signal as needed. The clamp circuit 10 clamps the zero level of the signal, and the A/D converter 11 converts the signal into a digital signal. This digital signal is stored in a first dark current component storage area 12a-1 of the dark memory 12a. Since the shutter 3 is kept closed, the CCD 5 presumably senses no image. The image signal thus stored in the dark memory 12a is a noise pattern produced by the influence of a dark current, i.e., a dark current noise component.

The user keeps turning on the switch SW1 (keeps pressing the release button halfway), and an image signal is read by again driving the CCD 5 with the shutter 3 being closed. The CDS circuit 8 removes noise from the read image signal, and the AGC 9 amplifies the signal as needed. The clamp circuit 10 clamps the zero level of the signal, and the A/D converter 11 converts the signal into a digital signal. This digital signal is stored in a second dark current component storage area 12a-2 of the dark memory 12a. The signal can also be compressed before being stored in the memory 12. This similarly applies to the following description.

When the user turns on the switch SW2 (i.e., when the user designates actual photographing), the CPU 18 controls the mechanism driving circuit 4 on the basis of the calculated control value, thereby adjusting the amount of light passing through the stop 2 and controlling the opening time (shutter speed) of the shutter 3. That is, an optical image of the object is formed on the image area of the CCD 5 with an appropriate light amount corresponding to the shutter opening time. The CCD 5 is driven by a driving signal which the image sensor driver 7 forms by amplifying the output from the TG 6. The CDS circuit 8 removes noise from the read image signal, the AGC 9 amplifies the signal as needed, and the clamp circuit 10 clamps the zero level of the signal. After that, the A/D converter 11 converts the signal into a digital signal, and this digital signal is stored in the signal memory 12b.

Subsequently, the image signal stored in the signal memory 12b and the dark current noise component stored in the dark memory 12a (the dark current noise storage area 12a-1 or 12a-2) are read out. The subtracter 13 subtracts the dark current noise component from the image signal. The signal processor 14 processes this image signal from which the dark current noise component is canceled. The processed signal is recorded on the recording medium 15 via the interface circuit 16. Note that a similar effect is obviously obtained by storing a dark current noise component in the dark memory 12a periodically or at an arbitrary timing while the switch SW1 is OFF.

The second operation example of the image sensing apparatus explained with reference to FIGS. 1 and 2 will be described below.

When a user turns on the switch SW1 of the operation unit 20 (presses the release button halfway) to instruct the camera to prepare for photographing, the camera starts photographing preparations.

First, the AE light receiving unit 21 measures the luminance of an object. On the basis of the measurement value, the CPU 18 calculates an appropriate F-number and shutter speed.

Next, an image signal is read by driving the CCD 5 with the shutter 3 being closed. The CDS circuit 8 removes noise from the read image signal, and the AGC 9 amplifies the signal as needed. The clamp circuit 10 clamps the zero level of the signal, and the A/D converter 11 converts the signal into a digital signal. This digital signal is stored in the first dark current component storage area 12a-1 of the dark memory 12a. Since the shutter 3 is kept closed, the CCD 5 presumably senses no image. The image signal thus stored in the dark memory 12a is a noise pattern produced by the influence of a dark current, i.e., a dark current noise component.

The user keeps turning on the switch SW1 (keeps pressing the release button halfway), and an image signal is read by again driving the CCD 5 with the shutter 3 being closed when a time T preset in the CPU 18 has elapsed. The CDS circuit 8 removes noise from the read image signal, and the AGC 9 amplifies the signal as needed. The clamp circuit 10 clamps the zero level of the signal, and the A/D converter 11 converts the signal into a digital signal. This digital signal is stored in the second dark current component storage area 12a-2 of the dark memory 12a.

The user further keeps turning on the switch SW1 (keeps pressing the release button halfway), and a new dark current noise component is overwritten in at least one of the two dark current noise storage regions on the dark memory 12a, in which a dark current noise component is stored earliest.

When the user turns on the switch SW2 (i.e., when the user designates actual photographing), the CPU 18 controls the mechanism driving circuit 4 on the basis of the calculated control value, thereby controlling the amount of light passing through the stop 2 and the opening time (shutter speed) of the shutter 3. That is, an optical image of the object is formed on the image area of the CCD 5 with an appropriate light amount corresponding to the shutter opening time. The CCD 5 is driven by a driving signal which the image sensor driver 7 forms by amplifying the output from the TG 6. The CDS circuit 8 removes noise from the read image signal, the AGC 9 amplifies the signal as needed, and the clamp circuit 10 clamps the zero level of the signal. After that, the A/D converter 11 converts the signal into a digital signal, and this digital signal is stored in the signal memory 12b.

Subsequently, the image signal stored in the signal memory 12b and at least the dark current noise components stored last in the two dark current noise storage areas of the dark memory 12a are read out. The subtracter 13 subtracts the dark current noise components from the image signal. The signal processor 14 processes this image signal from which the dark current noise components are canceled. The processed signal is recorded on the recording medium 15 via the interface circuit 16.

The third operation example of the image sensing apparatus explained with reference to FIGS. 1 and 2 will be described below.

Figure 3:
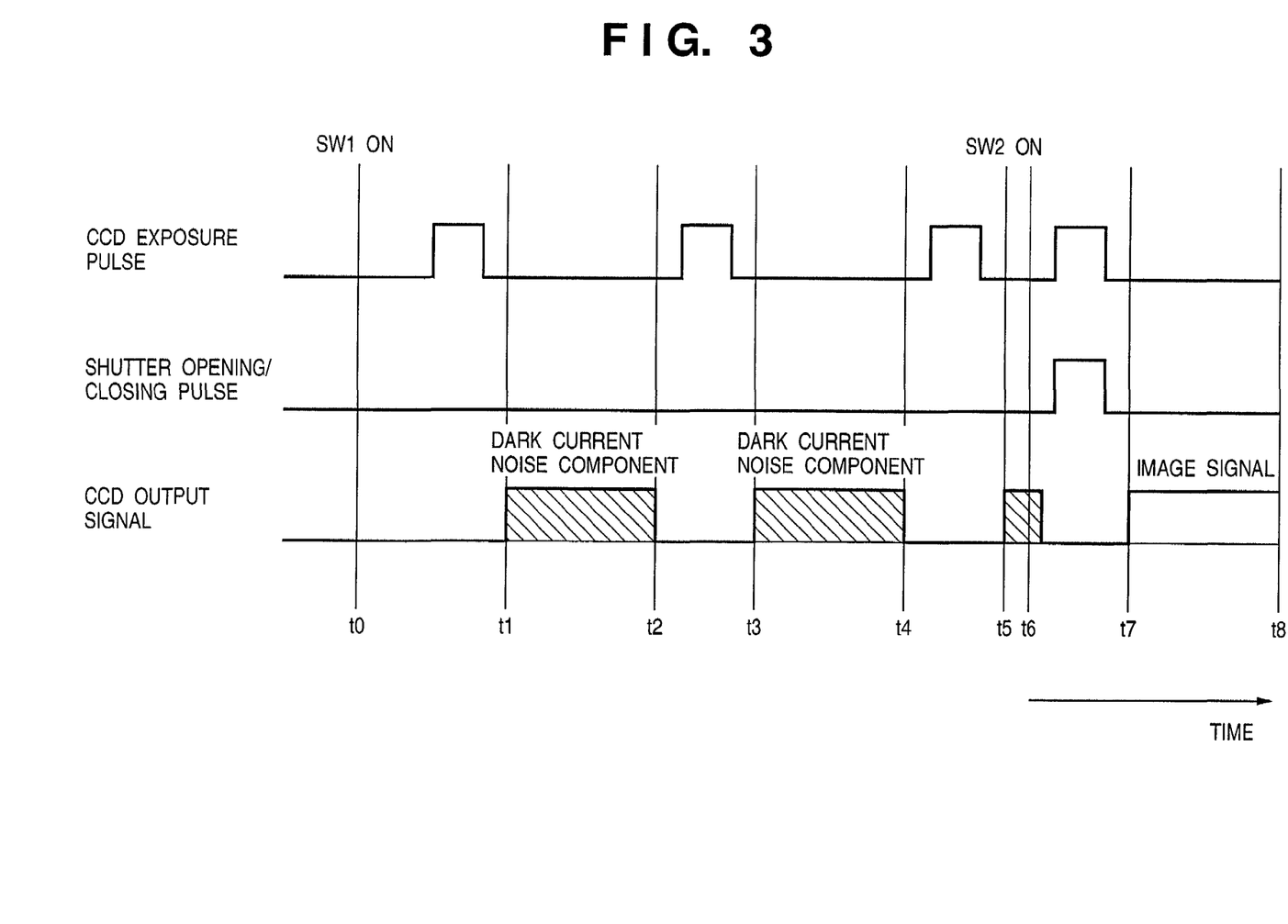
FIG. 3 is a timing chart showing the third operation example of the image sensing apparatus of the present invention.

FIG. 3 is a timing chart showing the passing of time in this operation example. When at time t0 a user turns on the switch SW1 of the operation unit 20 (presses the release button halfway) to instruct the camera to prepare for photographing, the camera starts photographing preparations. Note that the CPU 18 controls the following operation.

First, the AE light receiving unit 21 measures the luminance of an object. On the basis of the measurement value, the CPU 18 calculates an appropriate F-number and shutter speed.

Next, read of an image signal is started at time t1 by driving the CCD 5 with the shutter 3 being closed, while a CCD exposure pulse generated by the driving circuit 7 is "H". The CDS circuit 8 removes noise from the read image signal, and the AGC 9 amplifies the signal as needed. The clamp circuit 10 clamps the zero level of the signal, and the A/D converter 11 converts the signal into a digital signal. This digital signal is stored in the first dark current component storage area 12a-1 of the dark memory 12a. This storage is completed at time t2.

The user keeps turning on the switch SW1 (keeps pressing the release button halfway), and read of an image signal is started at time t3 by again driving the CCD 5 with the shutter 3 being closed, while the CCD exposure pulse is "H", when a time T preset in the CPU 18 has elapsed from the preceding exposure pulse. The CDS circuit 8 removes noise from the read image signal, and the AGC 9 amplifies the signal as needed. The clamp circuit 10 clamps the zero level of the signal, and the A/D converter 11 converts the signal into a digital signal. This digital signal is stored in the second dark current component storage area 12a-2 of the dark memory 12a. This storage is completed at time t4.

The user further keeps turning on the switch SW1 (keeps pressing the release button halfway), and read of an image signal is started at time t5 by again driving the CCD 5 with the shutter 3 being closed, while the CCD exposure pulse is "H", when the time T has elapsed from the preceding exposure pulse. The CDS circuit 8 removes noise from the read image signal, and the AGC 9 amplifies the signal as needed. The clamp circuit 10 clamps the zero level of the signal, and the A/D converter 11 converts the signal into a digital signal. This digital signal is stored in the first dark current component storage area 12a-1 (dark current noise storage area). That is, storage to the dark memory 12a is started at time t5. In this storage to the dark memory 12a, a new dark current noise component is overwritten in at least one of the two dark current noise storage regions on the dark memory 12a, in which a dark current noise component is stored earliest.

When the user turns on the switch SW2 (i.e., when the user designates actual photographing) at time t6, the CPU 17 controlled by the CPU 18 cancels the write operation of the third dark noise component being written in the dark memory 12a. To this end, the CPU 17 can directly control the address line or command line of the dark memory 12a or can issue instructions to the memory control device. Alternatively, instead of the canceled third dark current component, the fourth dark current component can be acquired after the object is photographed. This fourth dark current component can be used to correct the image signal when the object is photographed.

Subsequently, at time t7 the CPU 18 adjusts the amount of light passing through the stop 2 by controlling the mechanism driving circuit 4 on the basis of the calculated control value, and controls the opening time (shutter speed) of the shutter 3 by allowing the driving circuit 4 to generate a shutter opening/closing pulse. That is, while the CCD exposure pulse and the shutter opening/closing pulse are "H", an optical image of the object is formed on the image area of the CCD 5 with an appropriate light amount corresponding to the shutter opening time, and read of the third dark current noise component from the CCD 5 is canceled. The CCD 5 is driven by a driving signal which the image sensor driver 7 forms by amplifying the output from the TG 6, and accumulates the object image (more accurately, electric charge corresponding to the object image). This means actual photographing (exposure) responding to ON of the switch SW2.

After the object image is accumulated (photographed), read of the image signal accumulated in the CCD 5 is started at time t7 in accordance with the driving signal generated by the driving circuit 7. The CDS circuit 8 removes noise from the read image signal, the AGC 9 amplifies the signal as needed, and the clamp circuit 10 clamps the zero level of the signal. After that, the A/D converter 11 converts the signal into a digital signal, and this digital signal is stored in the signal memory 12b.

Subsequently, the image signal stored in the signal memory 12b and the dark current noise component stored second in the dark memory 12a (i.e., the latest and complete dark current component (of one frame)) are read out. The subtracter 13 subtracts the dark current noise component from the image signal. The signal processor 14 processes this image signal from which the dark current noise component is canceled. The processed signal is recorded on the recording medium 15 via the interface circuit 16.

In this operation example, it is unnecessary to wait for the start of actual photographing (the operation of opening the shutter and exposing the CCD to an object image) until the third dark current noise component is completely stored in the dark memory 12a. That is, it is possible to avoid the problem of a release time lag caused by the acquisition of dark current noise for dark correction.

Figure 5:
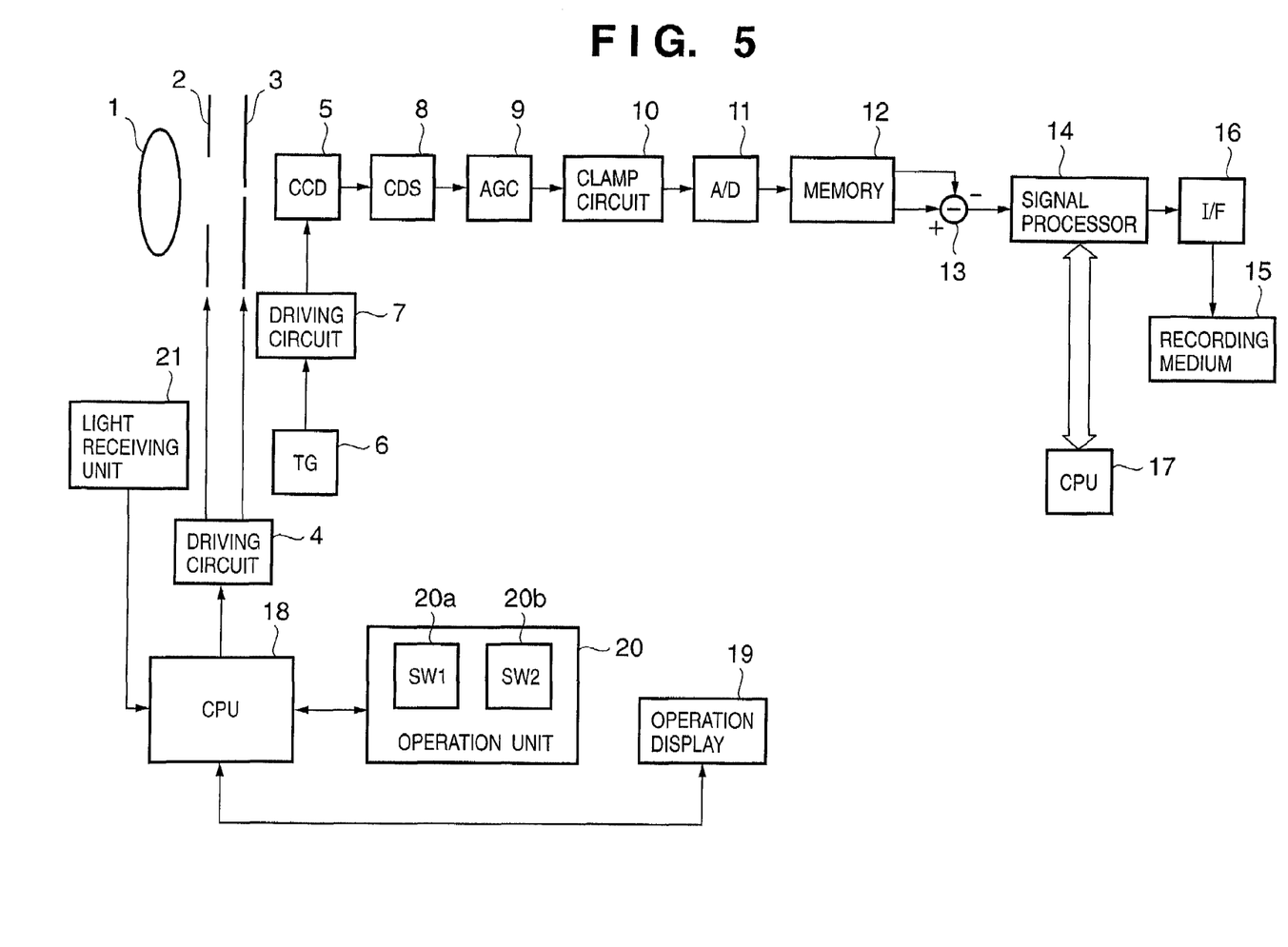
FIG. 5 is a schematic view showing the arrangement of an image sensing apparatus according to the second embodiment of the present invention.
Figure 6:
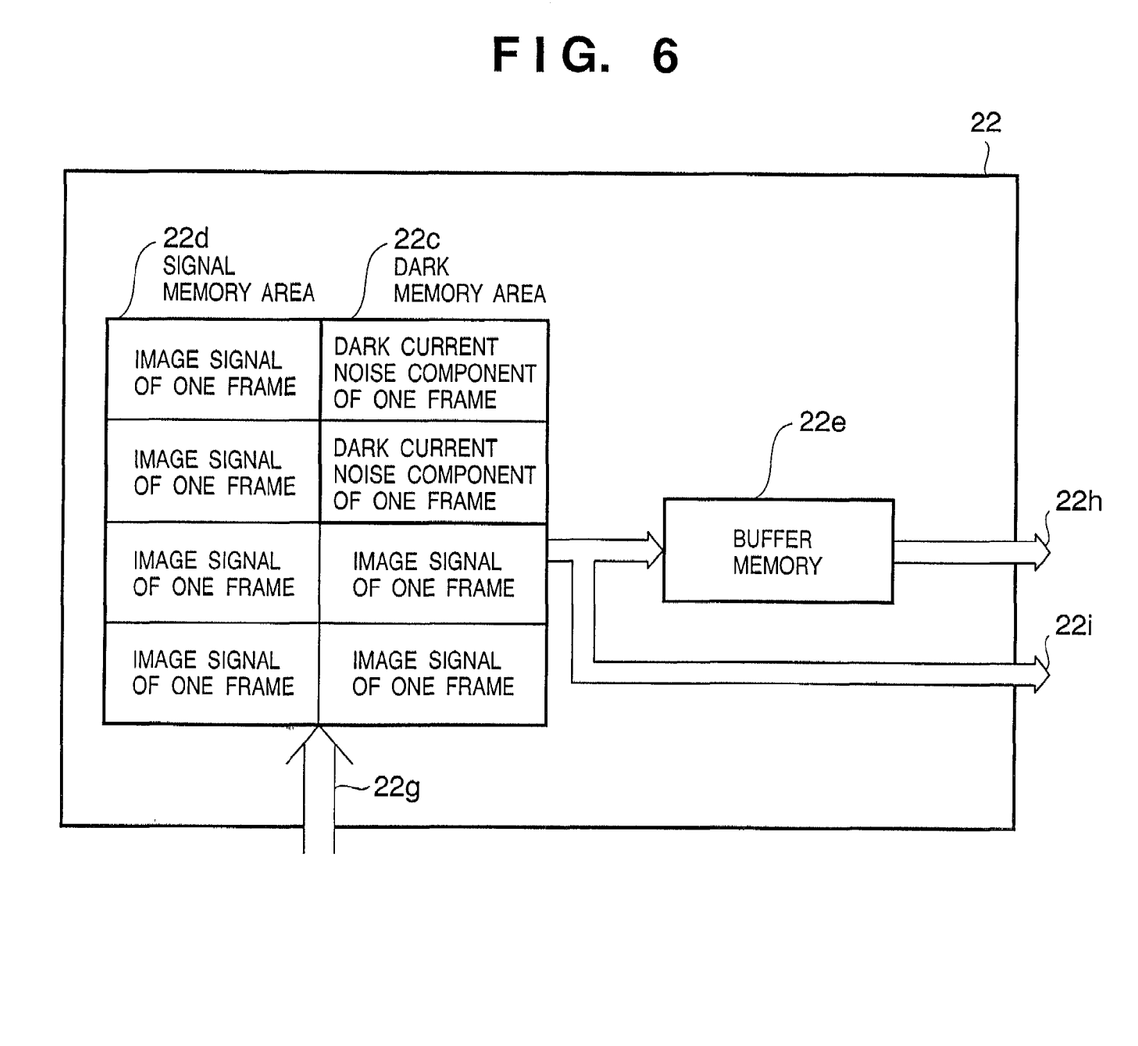
FIG. 6 is a schematic view showing the configuration of a memory 22 used in the present invention.

FIG. 5 is a schematic view showing the arrangement of an image sensing apparatus according to the second preferred embodiment of the present invention. Referring to FIG. 5, the same reference numerals as in FIG. 1 denote the same components. FIG. 6 is a schematic view showing the configuration of a memory 22 of the image sensing apparatus shown in FIG. 5. In this embodiment, a dark memory area 22c as a first memory area and a signal memory area 22d as a second memory area are formed on the memory 22 controlled by a single control signal (e.g., a command and address) 22g. This memory 22 includes a buffer memory 22e for synchronizing a dark current noise component and an image signal which are read out, with a certain time difference, from the dark memory area 22c and the signal memory area 22d. The synchronized dark current noise and image signal are output through data buses 22h and 22i, respectively. The rest is the same as in FIG. 1, so an explanation of other elements shown in FIG. 5 will be omitted.

Similar to FIG. 3 showing the third operation example, when at time t0 a user turns on a switch SW1 of an operation unit 20 (presses a release button halfway) to instruct the camera to prepare for photographing, the camera starts photographing preparations. Note that a CPU 18 controls the following operation.

First, an AE light receiving unit 21 measures the luminance of an object. On the basis of the measurement value, the CPU 18 calculates an appropriate F-number and shutter speed.

Next, read of an image signal is started at time t1 by driving a CCD 5 with a shutter 3 being closed, while a CCD exposure pulse generated by a driving circuit 7 is "H". A CDS circuit 8 removes noise from the read image signal, and an AGC 9 amplifies the signal as needed. A clamp circuit 10 clamps the zero level of the signal, and an A/D converter 11 converts the signal into a digital signal. This digital signal is stored in a first dark current component storage area 12a-1 of a dark memory 12a. This storage is completed at time t2.

The user keeps turning on the switch SW1 (keeps pressing the release button halfway), and read of an image signal is started at time t3 by again driving the CCD 5 with the shutter 3 being closed, while the CCD exposure pulse is "H", when a time T preset in the CPU 18 has elapsed from the preceding exposure pulse. The CDS circuit 8 removes noise from the read image signal, and the AGC 9 amplifies the signal as needed. The clamp circuit 10 clamps the zero level of the signal, and the A/D converter 11 converts the signal into a digital signal. This digital signal is stored in a second dark current component storage area 12a-2 of the dark memory 12a. This storage is completed at time t4.

The user further keeps turning on the switch SW1 (keeps pressing the release button halfway), and read of an image signal is started at time t5 by again driving the CCD 5 with the shutter 3 being closed, while the CCD exposure pulse is "H", when the time T has elapsed from the preceding exposure pulse. The CDS circuit 8 removes noise from the read image signal, and the AGC 9 amplifies the signal as needed. The clamp circuit 10 clamps the zero level of the signal, and the A/D converter 11 converts the signal into a digital signal. This digital signal is stored in the first dark current component storage area 12a-1 (dark current noise storage area). That is, storage to the dark memory area 22c is started at time t5. In this storage to the dark memory area 22c, a new dark current noise component is overwritten in at least one of the two dark current noise storage regions on the dark memory 12a, in which a dark current noise component is stored earliest.

When the user turns on a switch SW2 (i.e., when the user designates actual photographing) at time t6, a CPU 17 controlled by the CPU 18 cancels the write operation of the third dark noise component being written in the dark memory area 22c. To this end, the CPU 17 can directly control the dark memory area 22c or can issue instructions to, e.g., the memory control device.

Subsequently, at time t7 the CPU 18 adjusts the amount of light passing through a stop 2 by controlling a mechanism driving circuit 4 on the basis of the calculated control value, and controls the opening time (shutter speed) of the shutter 3 by allowing the driving circuit 4 to generate a shutter opening/closing pulse. That is, while the CCD exposure pulse and the shutter opening/closing pulse are "H", an optical image of the object is formed on the image area of the CCD 5 with an appropriate light amount corresponding to the shutter opening time, and read of the third dark current noise component from the CCD 5 is canceled. The CCD 5 is driven by a driving signal which an image sensor driver 7 forms by amplifying the output from a TG 6, and accumulates the object image (more accurately, electric charge corresponding to the object image). This means actual photographing (exposure) responding to ON of the switch SW2.

After the object image is accumulated (photographed), read of the image signal stored in the CCD 5 is started at time t7 in accordance with the driving signal generated by the driving circuit 7. The CDS circuit 8 removes noise from the read image signal, the AGC 9 amplifies the signal as needed, and the clamp circuit 10 clamps the zero level of the signal. After that, the A/D converter 11 converts the signal into a digital signal, and this digital signal is stored in the signal memory area 22d.

Subsequently, the image signal stored in the signal memory area 22d is read out and stored in the buffer memory 22e. Then, the dark current noise component stored second in the dark memory area 22c (i.e., the latest and complete dark current component) and the image signal stored in the buffer memory 22e are read out through the data buses 22i and 22h, respectively. A subtracter 13 subtracts the dark current noise component from the image signal. A signal processor 14 processes this image signal from which the dark current noise component is canceled. The processed signal is recorded on a recording medium 15 via an interface circuit 16.

For example, an image signal of one horizontal period is read out from the signal memory area 22d and stored in the buffer memory 22e. When the buffer memory 22e becomes full, the image signal is read out from this buffer memory 22e and at the same time the dark current noise component is read out from the dark memory area 22c, and these image signal and dark current noise component are input to the subtracter 13. It is obviously also possible to store in this buffer memory 22e the dark current noise component read out from the dark memory area 22c.

An image sensing apparatus according to the third embodiment of the present invention will be described below. The arrangements of this image sensing apparatus are the same as in FIGS. 1 and 2, so a detailed description thereof will be omitted.

Figure 4:
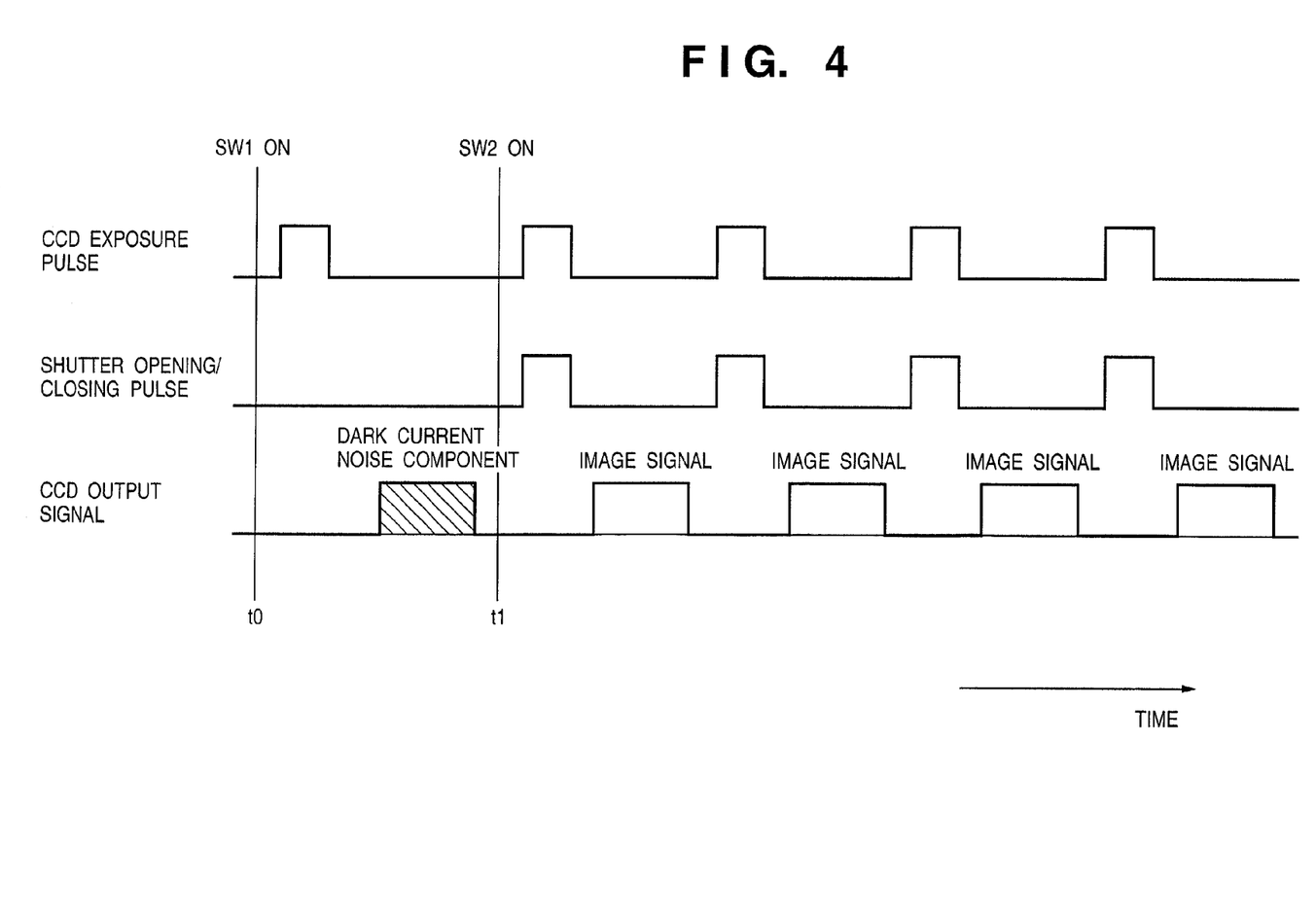
FIG. 4 is a timing chart showing the operation of an image sensing apparatus according to the third embodiment of the present invention.

FIG. 4 is a timing chart showing the operation of this embodiment. When a user turns on a switch SW1 of an operation unit 20 (presses a release button halfway) to instruct the camera to prepare for photographing, the camera starts photographing preparations. Note that a CPU 18 controls this operation.

First, an AE light receiving unit 21 measures the luminance of an object. On the basis of the measurement value, the CPU 18 calculates an appropriate F-number and shutter speed.

Next, an image signal is read by driving a CCD 5 with a shutter 3 being closed, while a CCD exposure pulse is "H". A CDS circuit 8 removes noise from the read image signal, and an AGC 9 amplifies the signal as needed. A clamp circuit 10 clamps the zero level of the signal, and an A/D converter 11 converts the signal into a digital signal. This digital signal is stored in a first dark current component storage area 12a-1 of a dark memory 12a. Since the shutter 3 is kept closed, the CCD 5 presumably senses no image. The image signal thus stored in the dark memory 12a is a noise pattern produced by the influence of a dark current, i.e., a dark current noise component.

When the user turns on a switch SW2 (i.e., when the user designates actual photographing) while a mode capable of continuous photographing is set by the operation unit 20, the CPU 18 adjusts the amount of light passing through a stop 2 by controlling a mechanism driving circuit 4 on the basis of the calculated control value, and controls the opening time (shutter speed) of the shutter 3 by allowing the driving circuit 4 to generate a shutter opening/closing pulse. That is, while the CCD exposure pulse and the shutter opening/closing pulse are "H", an optical image of the object is formed on the image area of the CCD 5 with an appropriate light amount corresponding to the shutter opening time. The CCD 5 is driven by a driving signal which an image sensor driver 7 forms by amplifying the output from a TG 6. The CDS circuit 8 removes noise from the read image signal, the AGC 9 amplifies the signal as needed, and the clamp circuit 10 clamps the zero level of the signal. After that, the A/D converter 11 converts the signal into a digital signal, and this digital signal is stored in a signal memory 12b.

The switch SW2 is kept turned on, and an image signal is similarly stored in another area of the signal memory 12b.

Subsequently, the image signal of a plurality of frames stored in the signal memory 12b and the dark current noise component stored second in the dark memory 12a are read out. A subtracter 13 subtracts the dark current noise component from the image signal. A signal processor 14 processes this image signal from which the dark current noise component is canceled. The processed signal is recorded on a recording medium 15 via an interface circuit 16.

If the signal memory 12b has no more area for storing a new image signal during continuous photographing of an object, the next image signal is stored in the dark memory 12a under the control of a CPU 17. The dark memory 12a has an area for storing dark current noise components of two or more frames. Therefore, while a necessary dark current noise component (which is either the only dark current noise component stored in one dark current noise component storage area or the latest one of dark current noise components of a plurality of frames stored in a plurality of dark current noise component storage areas) is stored in a certain area, this dark memory 12a can store an image signal pertaining to photographing of an object into the remaining area. Alternatively, if dark current noise is not to be corrected, e.g., if the performance of continuous photographing is regarded as important, the whole area of the memory 12a can be converted into an image signal storage area during continuous photographing.

Also, this operation example evidently holds for an arrangement, as in the second embodiment, in which a dark memory area 22c as a first memory area and a signal memory area 22d as a second memory area are formed on a single memory 22 controlled by a single control signal including a command and address, and a buffer memory 22e synchronizes a dark current noise component and an image signal read out from the memory 22 with a certain time difference.

An image sensing apparatus according to the fourth embodiment of the present invention will be described below with reference to the accompanying drawings.

Figure 7:
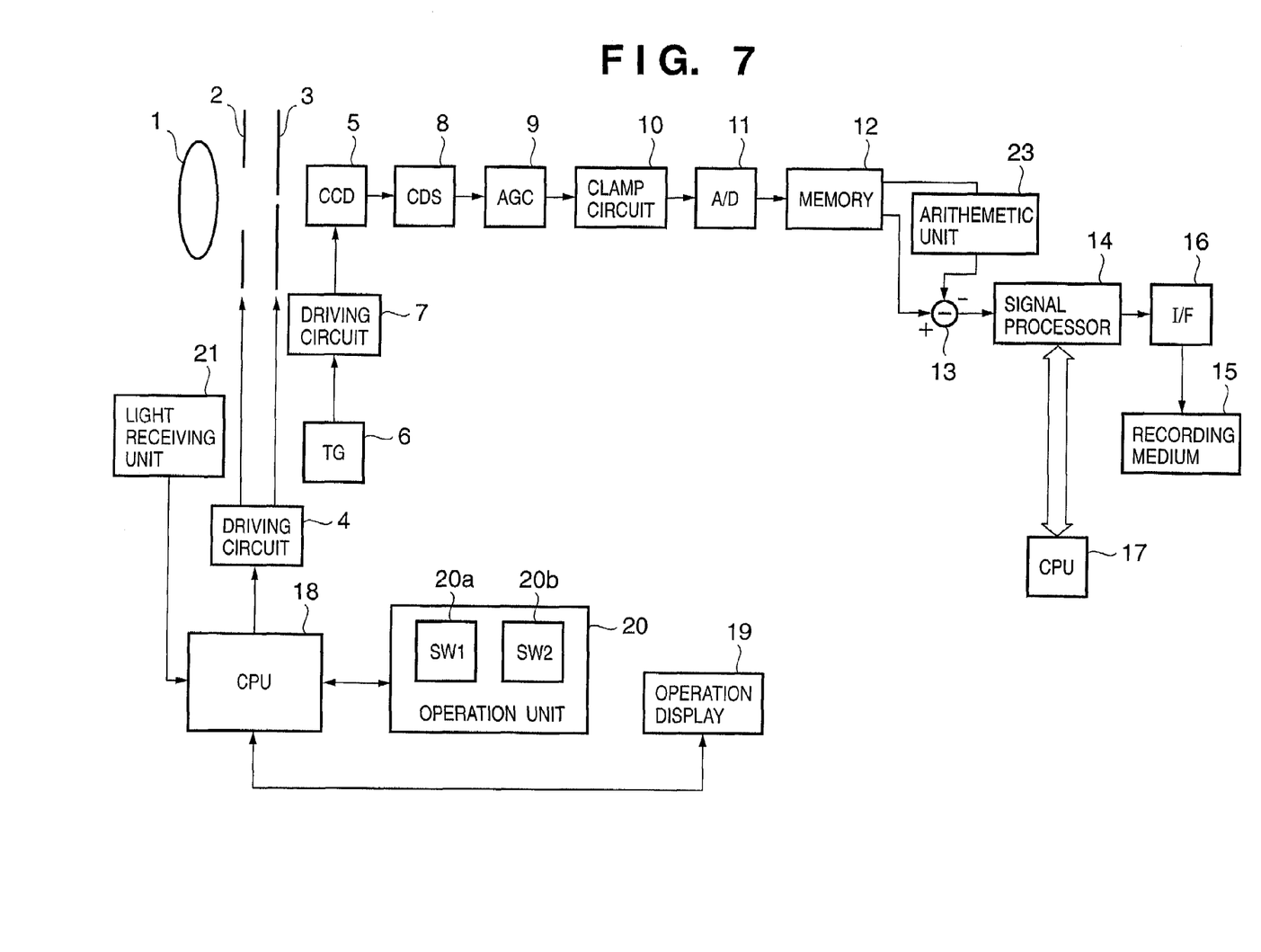
FIG. 7 is a schematic view showing the arrangement of an image sensing apparatus according to the fourth embodiment of the present invention.

FIG. 7 is a schematic view showing the fourth embodiment of the present invention. The same reference numerals as in FIG. 1 denote the same parts in FIG. 7. Reference numeral 1 denotes an optical lens for forming an optical image of an object; 2, a stop; 3, a shutter; 4, a driving circuit for individual mechanical parts; 5, a CCD as an image sensor for converting an optical image of an object into an electrical signal; 6, a TG (timing signal generator) for generating a timing signal required to drive the CCD 5; 7, an image sensor driver for amplifying the signal from the TG 6 to a level necessary to drive the CCD 5; 8, a CDS circuit for removing the output noise from the CCD 5; 9, an AGC circuit for amplifying the output signal from the CDS circuit 8; and 10, a clamp circuit for clamping the zero level of the amplified signal. Reference numeral 11 denotes an A/D converter for converting an analog signal into a digital signal; and 12, a memory which includes a dark memory 12a as a first memory area for storing dark current noise components and a signal memory 12b as a second memory area for storing image sensing signals. A schematic view of the dark memory 12a and the signal memory 12b is the same as FIG. 2.

Reference numeral 23 denotes an arithmetic unit for multiplying an output dark current noise component from the dark memory 12a by N; 13, a subtracter for subtracting the dark current noise component read out from the arithmetic unit 23 from an image signal read out from the signal memory 12b; 14, a signal processor for processing the image signal from which the dark current is removed, thereby converting the signal into a signal suited to storage in a recording medium; and 15, a recording medium such as a memory card or hard disk. Reference numeral 16 denotes an interface circuit for recording a signal on the recording medium 15; 17, a signal processing control CPU for controlling the signal processor 14; 18, a CPU for controlling the overall apparatus; 19, an operation display for displaying information for assisting operations and displaying the camera status; and 20, an operation unit for externally controlling the camera.

The operation of the above image sensing apparatus will be described below.

When a user turns on a switch SW1 of the operation unit 20 (presses a release button halfway) to instruct the camera to prepare for photographing, the camera starts photographing preparations.

First, an AE light receiving unit 21 measures the luminance of an object. On the basis of the measurement value, the CPU 18 calculates an appropriate F-number and shutter speed.

Next, an image signal is read by driving the CCD 5 with the shutter 3 being closed. The CDS circuit 8 removes noise from the read image signal, and the AGC 9 amplifies the signal as needed. The clamp circuit 10 clamps the zero level of the signal, and the A/D converter 11 converts the signal into a digital signal. This digital signal is stored in a first dark current component storage area 12a-1 of the dark memory 12a. Since the shutter 3 is kept closed, the CCD 5 presumably senses no image. The image signal thus stored in the dark memory 12a is a noise pattern produced by the influence of a dark current, i.e., a dark current noise component.

The user keeps turning on the switch SW1 (keeps pressing the release button halfway), and an image signal is read by again driving the CCD 5 with the shutter 3 being closed, when a time T preset in the CPU 18 has elapsed. The CDS circuit 8 removes noise from the read image signal, and the AGC 9 amplifies the signal as needed. The clamp circuit 10 clamps the zero level of the signal, and the A/D converter 11 converts the signal into a digital signal. This digital signal is stored in a second dark current component storage area 12a-2 of the dark memory 12a.

The user further keeps turning on the switch SW1, and a new dark current noise component is overwritten in at least one of the two dark current noise component storage areas on the dark memory 12a, in which the dark current noise component is stored earliest.

When the user turns on a switch SW2 (i.e., when the user designates actual photographing), the CPU 18 controls the mechanism driving circuit 4 on the basis of the calculated control value, thereby controlling the amount of light passing through the stop 2 and the opening time (shutter speed) of the shutter 3. That is, an optical image of the object is formed on the image area of the CCD 5 with an appropriate light amount corresponding to the shutter opening time. The CCD 5 is driven by a driving signal which the image sensor driver 7 forms by amplifying the output from the TG 6. The CDS circuit 8 removes noise from the readout image signal, the AGC 9 amplifies the signal as needed, and the clamp circuit 10 clamps the zero level of the signal. After that, the A/D converter 11 converts the signal into a digital signal, and this digital signal is stored in the signal memory 12b.

To cancel dark current irregularity contained in an image signal by subtracting a dark current noise component from the image signal, the exposure time of the CCD when the shutter is kept closed is desirably made equal to that of the CCD during photographing in which the shutter is opened and closed. The number of times of update of a dark current noise component per unit time can be increased by shortening the exposure time (more accurately, the charge storage time) of the CCD when the shutter is kept closed. In this embodiment, therefore, the CPU 18 has a function of adjusting the exposure time (storage time) of the CCD when the shutter is closed. With this adjusting function, the exposure time is set to be shorter than the normal exposure time (e.g., the exposure time in actual photographing immediately after the adjustment). In read, the arithmetic unit 23 amplifies the dark current noise component stored last in the dark memory 12a with a gain larger than 1, thereby making this exposure time apparently equal to the CCD exposure time during photographing in which the shutter is opened and closed. The subtracter 13 subtracts the dark current noise component thus calculated by the arithmetic unit 23 from the image signal read out from the signal memory 12a. The signal processor 14 processes the image signal from which the dark current noise component is canceled. The processed image signal is recorded on the recording medium 15 via the interface circuit 16.

Another embodiment is also possible in which the exposure time (more accurately, the charge storage time) of the CCD when the shutter is kept closed is set to be longer than the time during which the CCD is exposed in actual photographing performed by opening and closing the shutter, and the dark current noise component is read out from the dark memory 12a, amplified with a gain of less than 1 by the arithmetic unit 23, and passed through the subtracter 13. The effect of this embodiment is to obtain a dark current noise component by long-time exposure and process this dark current noise component with a minus gain, thereby suppressing the influence of noise in the circuit processing system.

Also, this embodiment obviously holds for an arrangement, as in the second embodiment of the present invention, in which a dark memory area 22c as a first memory area and a signal memory area 22d as a second memory area are formed on a single memory 22 controlled by a single control signal including a command and address, and a buffer memory 22e synchronizes a dark current noise component and an image signal read out from the memory 22 with a certain time difference.

In each embodiment described above, a similar explanation holds even when the image sensor is a MOS image sensor, rather than a CCD image sensor.

Also, the whole or part of the software in the above embodiments can be replaced with hardware, and the whole or part of the hardware in the above embodiments can be replaced with software.

In addition, either the whole or part of the apparatus and method according to each of the above embodiments can constitute the invention.

Furthermore, the apparatus and its components in each of the above embodiments can be practiced as part of another apparatus or practiced as they are combined with another apparatus.

Further, the functions of the above embodiments can also be achieved by providing a storage medium (or a recording medium) recording program codes of predetermined software to a system or an apparatus. In this case, the functions of the above embodiments can be implemented by allowing a computer to execute the program codes stored in the storage medium or by permitting an OS (Operating System) or the like running on the computer to execute part or the whole of actual processing on the basis of designations by the program codes. Furthermore, the functions of the above embodiments can be implemented when, after the program codes read out from the storage medium are written in a memory of a function extension board inserted into a computer or of a function extension unit connected to a computer, a CPU or the like of the function extension board or function extension unit executes part or the whole of actual processing in accordance with designations by the program codes.

As has been explained above, the preferred embodiments of the present invention achieve the effect of avoiding missing a photographing timing intended by a user owing to acquisition of dark current noise for dark correction.

Also, in the preferred embodiments of the present invention, a dark memory has at least one dark current noise storage area, and dark current noise components in these dark current noise storage areas are updated at any time. Therefore, even if a dark current noise component is not completely stored in one dark current noise storage area when actual photographing is designated, a dark current noise component stored in another dark current noise storage area can be read out. By subtracting this dark current noise component from an image signal read out from the second memory area, missing of a release timing caused by acquisition of a dark current noise component can be prevented. Additionally, dark current irregularity can be effectively canceled by correcting the image signal by using the latest dark current noise component.

Furthermore, the memory area can be efficiently used by using the first memory area as an image signal storage area.

As many apparently widely different embodiments of the present invention can be made without departing from the spirit and scope thereof, it is to be understood that the invention is not limited to the specific embodiments thereof except as defined in the claims.

What is claimed is:

1. An image sensing apparatus comprising:
   an image sensor;
   a shielding member capable of shielding a light to said image sensor from an object;
   a storage area adapted to store first signals for at least two frames independently, wherein the first signals are generated by said image sensor when a light to said image sensor from the object is shielded by said shielding member;
   a first controller adapted to repeatedly overwrite new first signals in said storage area of the at least two frames in an alternative order;
   a second controller adapted to stop overwriting a new first signal in the storage area when a capturing operation of a second signal is designated after the new first signal begins to overwrite in the storage area, wherein the second signal is generated by said image sensor when a light to said image sensor from the object is not shielded by said shielding member; and
   a correction unit adapted to correct the second signal based on a most recent first signal stored with a complete frame in said storage area before the capturing operation of the second signal is initiated.

2. The apparatus according to claim 1, wherein whenever overwriting a new first signal for one frame generated by said image sensor on the first signal in said storage area, said first controller switches storage areas of the first signals on which the new first signal is to be overwritten.

3. The apparatus according to claim 1, wherein said first controller overwrites new first signals generated by said image sensor on the first signals in said storage area at a predetermined time interval in a photographing preparation state.

4. The apparatus according to claim 1, wherein said first controller overwrites new signals generated by said image sensor on the first signals in said storage area at a predetermined time interval.

5. The apparatus according to claim 1, wherein said correction unit subtracts the first signal stored in said storage area from the second signal.

6. The apparatus according to claim 1, wherein said first controller allows storage of the second signal into said storage area in continuous photographing.

7. The apparatus according to claim 1, wherein said first controller allows storage of the second signal into said storage area.

8. The apparatus according to claim 1, wherein the first signal generated by said image sensor contains a dark current noise component.

9. The apparatus according to claim 8, wherein said first controller has a function of controlling the time of storage of electric charge to said image sensor during which a dark current noise component is acquired.

10. The apparatus according to claim 9, wherein said correction unit corrects the second signal based on a noise component stored in said storage area and the time of storage of electric charge to said image sensor during which the noise component is acquired.

11. A method of controlling an image sensing apparatus having an image sensor, a shielding member capable of shielding a light to the image sensor from an object, and a storage area adapted to store first signals for at least two frames independently, wherein the first signals are generated by the image sensor when a light to the image sensor from the object is shielded by the shielding member, the method comprising:
   a first control step of repeatedly overwriting new first signals in the storage area of the at least two frames in in an alternative order,
   a second control step of stopping overwriting a new first signal in the storage area when a capturing operation of a second signal is designated after the new first signal begins to overwrite in the storage area, wherein the second signal is generated by the image sensor when a light to said image sensor from the object is not shielded by the shielding member; and
   a correction step of correcting the second signal based on a most recent first signal stored with a complete frame in the storage area before the capturing operation of the second signal is initiated.

* * * * *

UNITED STATES PATENT AND TRADEMARK OFFICE
CERTIFICATE OF CORRECTION

PATENT NO. : 6,982,757 B2
DATED : January 3, 2006
INVENTOR(S) : Motoi Tariki It is certified that error appears in the above-identified patent and that said Letters Patent is hereby corrected as shown below:

Column 10,
Line 47, delete "12ais" and replace with -- 12a is --.

Signed and Sealed this

Fourth Day of April, 2006

JON W. DUDAS
*Director of the United States Patent and Trademark Office*